Figure 1:
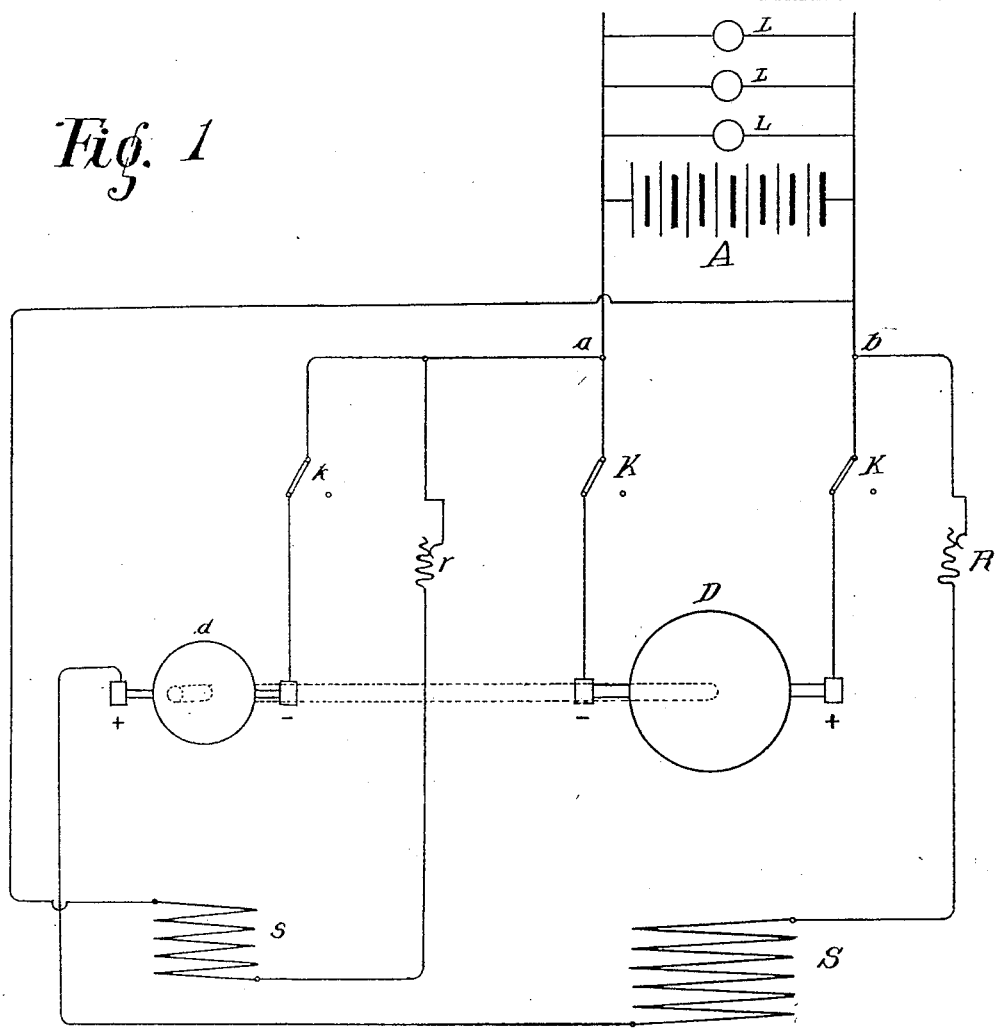

No. 805,725. PATENTED NOV. 28, 1905.
M. VON HOOR, F. REINITZ & L. STARK.
CONTROLLING DEVICE FOR ELECTRIC GENERATORS.
APPLICATION FILED APR. 17, 1901.

2 SHEETS—SHEET 1.

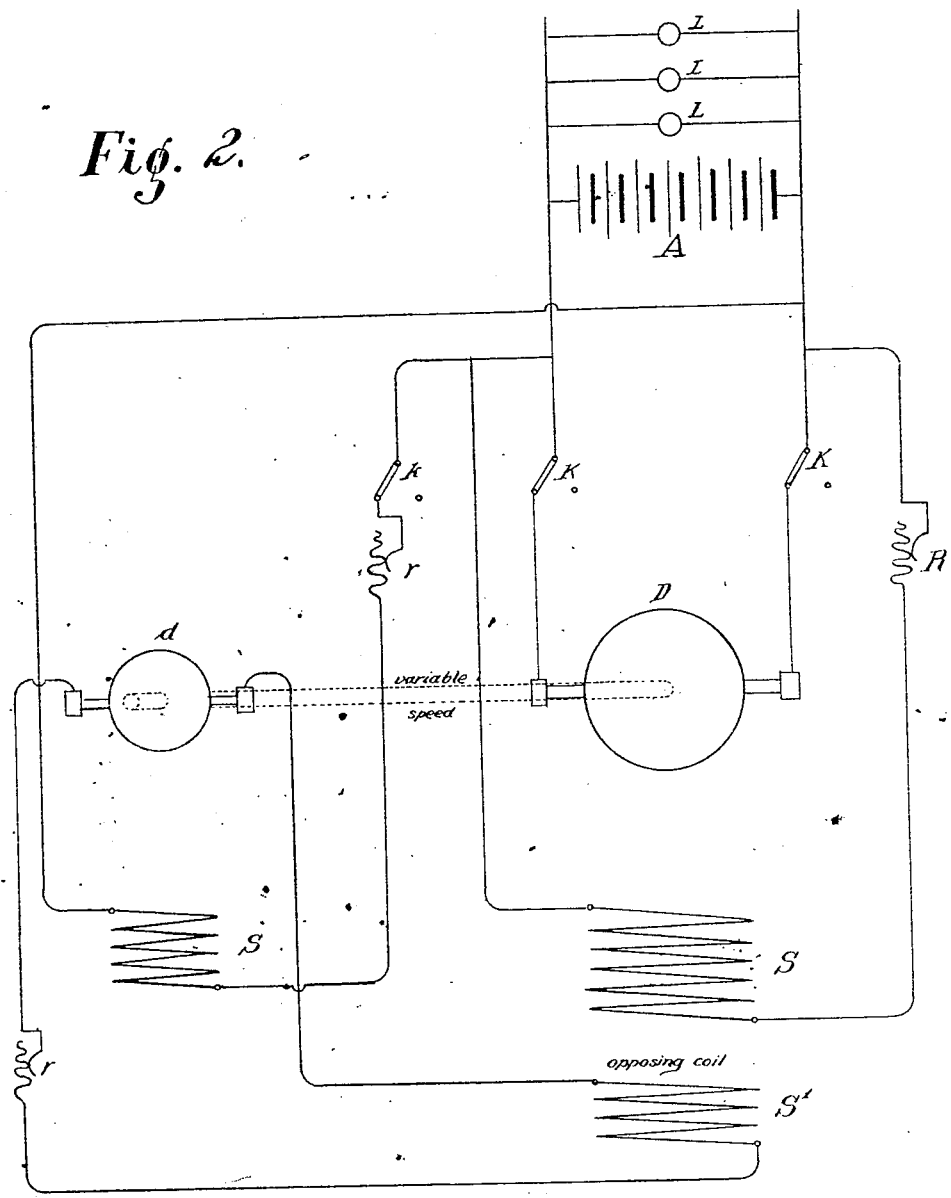

UNITED STATES PATENT OFFICE.

MORITZ VON HOOR, FRIEDRICH REINITZ, AND LEOPOLD STARK, OF BUDAPEST, AUSTRIA-HUNGARY.

CONTROLLING DEVICE FOR ELECTRIC GENERATORS.

No. 805,725.  Specification of Letters Patent.  Patented Nov. 28, 1905.

Application filed April 17, 1901. Serial No. 56,243.

*To all whom it may concern:*

Be it known that we, MORITZ VON HOOR, FRIEDRICH REINITZ, and LEOPOLD STARK, subjects of the Emperor of Austria-Hungary, and residents of Budapest, Austria-Hungary, have invented certain new and useful Improvements in Controlling Devices for Electric Generators, of which the following is a specification.

This invention relates to means for controlling generators actuated by sources of power operating at variable speeds, such as the shafts of water-wheels and windmills, the axles of railway-cars used for supplying power for electric lighting, and the like.

The objects of this invention are to furnish a device for producing a uniform voltage of electric generators actuated by such sources of power as above mentioned by making the voltage of said generators independent within certain limits from the speed of the actuating source.

It consists, then, in combining with the generator an auxiliary generator, which is rotated by intermediate gearing from the main generator or its driving-shaft, and in combining said generators in such a manner that the auxiliary generator serves to increase the field density of the main dynamo when the speed of the driving-shaft decreases, and vice versa.

Other elements and modifications will be more fully pointed out and described hereinafter.

In the drawings, Figure 1 is a diagrammatical representation of a controlling device embodying this invention. Fig. 2 is a modified form of the invention.

The voltage of an electric generator actuated by a shaft revolving at variable speed changes in proportion with the speed provided the exciting-current remains approximately uniform, so that such a generator cannot be used if an approximately uniform voltage is required.

This invention avoids the use of complicated and unreliable mechanical regulating devices such as have been in use heretofore and substitutes therefor a device for automatically varying the field density of the generator running at variable speed by introducing an electromotive force in one of the field-coils of the generator, said electromotive force varying in proportion to the speed.

D is the armature, S the field-coils, and R the field-rheostat, of the main generator. *d s r* are the same parts, respectively, of the auxiliary generator.

K K *k* are switches.

A indicates accumulators; L L, electric lamps or other apparatus consuming electricity. Below a certain degree of speed we employ accumulators connected in multiple (and placed, for instance, upon the vehicle or in the cars) for feeding the desired electric current.

As will be seen from the drawings, Fig. 1, the armature of the auxiliary dynamo is connected in series with the field-coils S of the main dynamo. If the poles are arranged in such manner that the armature of the auxiliary dynamo will produce an electromotive force in opposite direction to the electromotive force prevailing at the points *a b*, the auxiliary dynamo will weaken the field of the main dynamo, because the increasing voltage of the auxiliary dynamo is increasing in proportion to the increasing number of revolutions. By appropriately selecting and suitably determining the electromagnetic agents and characteristics of both dynamos the resistance of the field-coils, the limits of voltage in the auxiliary dynamo, &c., our device will result in equalizing the voltage of the main dynamo within extreme limits.

We will mention for an example that a dynamo with accumulators connected in multiple employed for a railway-train lighting at fourteen hundred revolutions per minute (corresponding to a speed of the train of fifty miles per hour) five thousand watts with thirty-three volts of terminal voltage has furnished eight hundred watts and thirty-one volts at a speed of twenty-two and one-half miles per hour (six hundred and thirty revolutions per minute) without necessitating any change or adjustment of the brushes or the rheostats.

Fig. 2 shows a modified form of this invention, the current of the main dynamo being influenced by the field of the auxiliary dynamo through a special coil S', producing ampere-windings acting in opposite directions to the coil S—that is to say, the coil S' is opposed to the field-coil S and tends to weaken the current of the main generator-dynamo with an increase in the number of revolutions or the speed of rotation thereof. The exciting-current of the main as well as of the auxiliary dynamo is branched off at points where a constant-potential difference exists—for instance, between the switch and the accumulators, as shown in Fig. 2. It is hereby secured that the dynamos will be excited under all circumstances. Further, a uniform voltage of the exciting-current of the auxiliary dynamo is obtained, and the characteristics of both dynamos will be in simple relation, so as to permit an exact adjustment, and this we consider the characteristic feature of the invention.

The rheostats R r, as shown in the drawings, are usually not used for regulating the tension of the current, but serve to adjust the regulating limits of the apparatus as a whole by temporarily changing the rheostats in accordance with the kind of the railway-train and the character of the railroad and in conformity with the time the train is in motion and the time of the stops, or, for instance, if water-wheels or windmills are used as sources of power, in accordance with the variable speed of the water or of the wind.

Various modifications and changes in detail may be made in this invention without departing from the scope thereof, and we do not limit ourselves to the exact arrangement herein described; but

What we claim, and desire to secure by Letters Patent, is—

In a controlling device for producing a uniform voltage in electric generators, the combination with a main dynamo running at variable speed, and an auxiliary dynamo running at a speed proportional to that of the main dynamo, a circuit of constant potential supplied by said main dynamo, a single field-magnet winding for the auxiliary dynamo, said winding being connected across said circuit, main and opposing field-windings for said main dynamo, said main field-winding being connected across said circuit and said opposing field-winding being connected across the brushes of said auxiliary dynamo.

In witness whereof we have hereunto set our hands in presence of two witnesses.

MORITZ VON HOOR.
FRIEDRICH REINITZ.
LEOPOLD STARK.

Witnesses:
PAUL JOSEPH TOMANSCZY, Jr.,
PAUL BÖENKEY.